US012595165B2

(12) United States Patent
Kimberlin et al.

(10) Patent No.: US 12,595,165 B2
(45) Date of Patent: Apr. 7, 2026

(54) REED SWITCH PUMP

(71) Applicant: PROCON US, INC., Smyrna, TN (US)

(72) Inventors: Robert R. Kimberlin, Rockvale, TN (US); Matthew Patrick Murphy, Fairview, TN (US); Brian S. Waters, Carthage, TN (US)

(73) Assignee: Micropump, Inc., Camas, WA (US)

( * ) Notice: Subject to any disclaimer, the term of this patent is extended or adjusted under 35 U.S.C. 154(b) by 394 days.

(21) Appl. No.: 18/142,287

(22) Filed: May 2, 2023

(65) Prior Publication Data

US 2024/0246808 A1 Jul. 25, 2024

Related U.S. Application Data

(60) Provisional application No. 63/440,013, filed on Jan. 19, 2023.

(51) Int. Cl.

*B67D 1/12* (2006.01)
*B67D 1/00* (2006.01)
*B67D 1/10* (2006.01)
*F04B 17/03* (2006.01)

(Continued)

(52) U.S. Cl.

CPC ........... *B67D 1/125* (2013.01); *B67D 1/0021* (2013.01); *B67D 1/102* (2013.01); *F04B 17/03* (2013.01);

(Continued)

(58) Field of Classification Search

CPC ........ G08B 21/187; F04B 49/06; F04B 49/02; F04B 19/04; F04B 17/03; B67D 1/0021; B67D 1/125

See application file for complete search history.

(56) References Cited

U.S. PATENT DOCUMENTS 9,022,177 B2 5/2015 Conley et al.
9,192,260 B2 * 11/2015 Glucksman ............ A47J 31/32

(Continued)

FOREIGN PATENT DOCUMENTS

CN 1308911 A 8/2001
DE 102011111180 A1 2/2013

(Continued)

OTHER PUBLICATIONS

Patent Cooperation Treaty, International Searching Authority, International Search Report and Written Opinion for PCT Application No. PCT/US2024/011924, International filing Date: Jan. 18, 2024, Form PCT/ISA/220, Mailing Date: May 16, 2024.

*Primary Examiner* — Jeremy Carroll
(74) *Attorney, Agent, or Firm* — Luedeka Neely, P.C.

(57) ABSTRACT

A beverage syrup pump system is disclosed including a pump housing having an internal pumping chamber, a pump motor, and a pumping mechanism driven by the motor within the pumping chamber. The pumping mechanism receives a syrup fluid at a first pressure and discharges the fluid at a second pressure which is greater than the first pressure. Connected to the pumping chamber is a cylindrical space with a spring and a plunger having a magnet. The plunger is in contact with a quantity of the fluid at a second pressure and moves along the cylindrical space against the biasing force of the spring. Once the second pressure exceeds a predetermined pressure, the corresponding fluid pressure in the cylindrical space exerts enough force on the plunger to move it past a predetermined point within the cylindrical space such that the magnet causes a reed switch in a first position switch to move to a second position and send a signal to a controller. The controller will immediately stop the pump motor if it receives the signal from the reed (Continued)

switch, or if a timer sends a signal indicating the pump has been running for a predetermined maximum run time.

10 Claims, 6 Drawing Sheets

(51) Int. Cl.

| | |
|---|---|
| ***F04B 19/04*** | (2006.01) |
| ***F04B 49/02*** | (2006.01) |
| ***F04B 49/06*** | (2006.01) |
| ***G08B 21/18*** | (2006.01) |

(52) U.S. Cl.

CPC .............. *F04B 19/04* (2013.01); *F04B 49/02* (2013.01); *F04B 49/06* (2013.01); *G08B 21/187* (2013.01)

(56) References Cited

U.S. PATENT DOCUMENTS

| | | | | |
|---|---|---|---|---|
| 9,474,409 | B2 * | 10/2016 | Wallerstorfer .......... | A47J 31/60 |
| 9,663,931 | B2 | 5/2017 | Withrington | |
| 10,081,531 | B2 | 9/2018 | Murison et al. | |
| 10,280,060 | B2 | 5/2019 | Opstal et al. | |
| 10,294,092 | B2 | 5/2019 | Volftsun | |
| 10,674,857 | B2 | 6/2020 | Lyons et al. | |
| 2005/0126515 | A1 | 6/2005 | Balan et al. | |
| 2008/0029541 | A1 * | 2/2008 | Wallace ............... | B67D 1/0079 222/207 |
| 2008/0276534 | A1 | 11/2008 | Bissonnette et al. | |
| 2016/0318748 | A1 | 11/2016 | Ryan et al. | |
| 2017/0215357 | A1 | 8/2017 | Narasipur | |
| 2018/0252191 | A1 * | 9/2018 | Pitcel ...................... | F04B 17/03 |
| 2023/0303383 | A1 * | 9/2023 | Callaghan .............. | B67D 1/124 |

FOREIGN PATENT DOCUMENTS

| | | | | |
|---|---|---|---|---|
| GB | 2046709 | A * | 11/1980 | ............... B67D 1/04 |
| GB | 2183216 | A | 6/1987 | |
| WO | 2019024811 | A1 | 2/2019 | |

* cited by examiner

REED SWITCH PUMP

FIELD

This disclosure relates to the field of fluid pumps. More particularly, this disclosure relates to a pump and related controller system for a post-mix beverage dispenser system utilizing a reed switch.

BACKGROUND

Post-mix beverage dispensers combine carbonated water with a concentrated beverage syrup to provide a final beverage for dispensing and consumption. The beverage syrup, which is often a dense and/or viscous fluid, is typically supplied from a bag-in-box syrup container. A syrup pump may be used to move the syrup from the syrup container to the dispensing nozzle.

There exists a plethora of sophisticated, but complicated designs for syrup pumps, utilizing programmable circuit boards, processors, sensors, transducers, data transmitters, and the like. These designs may perform well and provide a wide range of data to end user, but often lead to more expensive units that, while customizable, prove more complex than desired.

Accordingly, what is desired is an improved syrup pump for a beverage dispenser that is low cost, and that operates using an intuitive and mechanically simple, yet effective design.

SUMMARY

The above and other needs are met a syrup pump and controller system made in accordance with the present disclosure.

In a first aspect, the present disclosure provides a pump and controller system. In one embodiment, the pump and controller system includes a pump housing having an internal pumping chamber, an inlet port and an outlet port, each of the ports being in flow communication with the pumping chamber. The pumping chamber further includes a cylindrical space having an orifice which is also in flow communication with the pumping chamber.

The pump and controller system also includes a pump motor and a circuit board having a controller for starting and stopping the pump motor. A pumping mechanism is also included which is driven by the pump motor. This pumping mechanism is at least partially disposed within the pumping chamber, the pumping mechanism being capable of receiving a fluid through the inlet port into the pumping chamber at a first pressure and discharging the fluid from the pumping chamber through the outlet port at a second pressure which is greater than the first pressure.

A plunger, having a plunger head and a magnet attached to the plunger, is movably disposed within the cylindrical space. The plunger head is in contact with a quantity of the fluid at the second pressure so that the fluid exerts a force pushing the plunger into the cylindrical space.

A spring is disposed within the cylindrical space adjacent the plunger. The spring exerts a biasing force pushing the plunger away from the spring, so that the plunger and the magnet move back and forth along a predetermined path within the cylindrical space as the second pressure increases or decreases.

A reed switch, which is movable between a first and a second position, is disposed adjacent the path of the plunger magnet along the cylindrical space. In some instances, the first position may be an open position and the second position is closed. Alternatively, the first position may be a closed position and the second position is open. The reed switch moves to a second position when the magnet plunger moves beyond a predetermined point corresponding to the second pressure exceeding a predetermined pressure limit. Movement of the reed switch to the second position causes the controller to stop the pump motor and movement of the reed switch to the first position causes the controller to start the pump motor.

In certain embodiments of the pump and controller system, the pump is a gear pump. In these embodiments, the pumping mechanism preferably includes a drive gear, having a plurality of drive gear teeth, which is disposed within the pumping chamber and rotatably driven by the pump motor. The pumping mechanism also preferably includes an idler gear, having a plurality of idler gear teeth intermeshed with the drive gear teeth, which is disposed within the pumping chamber and attached to an idler shaft disposed within the pumping chamber.

In certain embodiments of the pump and controller system, the circuit board preferably also includes a timer for measuring how long the pump motor runs, where the timer sends a signal to the controller to stop the pump motor if the pump motor runs continuously for a period of time exceeding a predetermined maximum run time.

According to some embodiments of the pump and controller system, the circuit board preferably includes a first indicator light to indicate when the pump is running.

In accordance with some embodiments of the pump and controller system, the circuit board preferably includes a second indicator light to indicate a fault condition.

In a second aspect, the present disclosure provides a post-mix beverage dispenser. In one embodiment, the post-mix beverage dispenser includes a beverage mixing and dispensing nozzle and a supply of carbonated water in flow communication with the beverage mixing and dispensing nozzle. The post-mix beverage dispenser also includes a supply of beverage syrup and a beverage syrup pump and controller system.

The beverage syrup pump and controller system, in turn, includes a pump housing having an internal pumping chamber, an inlet port and an outlet port, each of the ports being in flow communication with the pumping chamber. The pumping chamber further includes a cylindrical space having an orifice which is also in flow communication with the pumping chamber.

The pump and controller system also includes a pump motor and a circuit board having a controller for starting and stopping the pump motor. A pumping mechanism is also included which is driven by the pump motor. This pumping mechanism is at least partially disposed within the pumping chamber, the pumping mechanism being capable of receiving a fluid through the inlet port into the pumping chamber at a first pressure and discharging the fluid from the pumping chamber through the outlet port at a second pressure which is greater than the first pressure.

A plunger, having a plunger head and a magnet attached to the plunger, is movably disposed within the cylindrical space. The plunger head is in contact with a quantity of the fluid at the second pressure so that the fluid exerts a force pushing the plunger into the cylindrical space.

A spring is disposed within the cylindrical space adjacent the plunger. The spring exerts a biasing force pushing the plunger away from the spring, so that the plunger and the magnet move back and forth along a predetermined path within the cylindrical space as the second pressure increases or decreases.

A reed switch, which is movable between a first position and a second position, is disposed adjacent the path of the plunger magnet along the cylindrical space. The reed switch moves to a second position when the magnet plunger moves beyond a predetermined point corresponding to the second pressure exceeding a predetermined pressure limit. Movement of the reed switch to the second position causes the controller to stop the pump motor and movement of the reed switch to the open position causes the controller to start the pump motor.

In certain embodiments of the beverage dispenser, the pump is a gear pump. In these embodiments, the pumping mechanism preferably includes a drive gear, having a plurality of drive gear teeth, which is disposed within the pumping chamber and rotatably driven by the pump motor. The pumping mechanism also preferably includes an idler gear, having a plurality of idler gear teeth intermeshed with the drive gear teeth, which is disposed within the pumping chamber and attached to an idler shaft disposed within the pumping chamber.

According to certain embodiments of the beverage dispenser, the circuit board preferably also includes a timer for measuring how long the pump motor runs, where the timer sends a signal to the controller to stop the pump motor if the pump motor runs continuously for a period of time exceeding a predetermined maximum run time.

In some embodiments of the beverage dispenser, the circuit board preferably includes a first indicator light to indicate when the pump is running.

In accordance with some embodiments of the beverage dispenser, the circuit board preferably includes a second indicator light to indicate a fault condition.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

The present disclosure relates to a pump and a related pump controller system. The pump and controller system is particularly suited for pumping beverage syrups in a post-mix beverage dispenser.

As shown in FIGS. 1-4, a pump and controller system 10 according to the present disclosure includes a pump housing 12 which is generally formed from a high strength material, such as brass, stainless steel, or another metal or alloy. Alternatively, the pump housing 12 may be molded from a polymeric material, preferably a polymeric material embedded with a fiber reinforcement material, such as carbon fiber or fiberglass filaments. The pump housing 12 may be further protected by a cap 72. Like the pump housing 12, the cap 72 may be formed from a high strength material, such as brass, stainless steel, or another metal or alloy. Alternatively, the cap 72 may be molded from a polymeric material, preferably a polymeric material embedded with a fiber reinforcement material, such as carbon fiber or fiberglass filaments.

Figure 1:
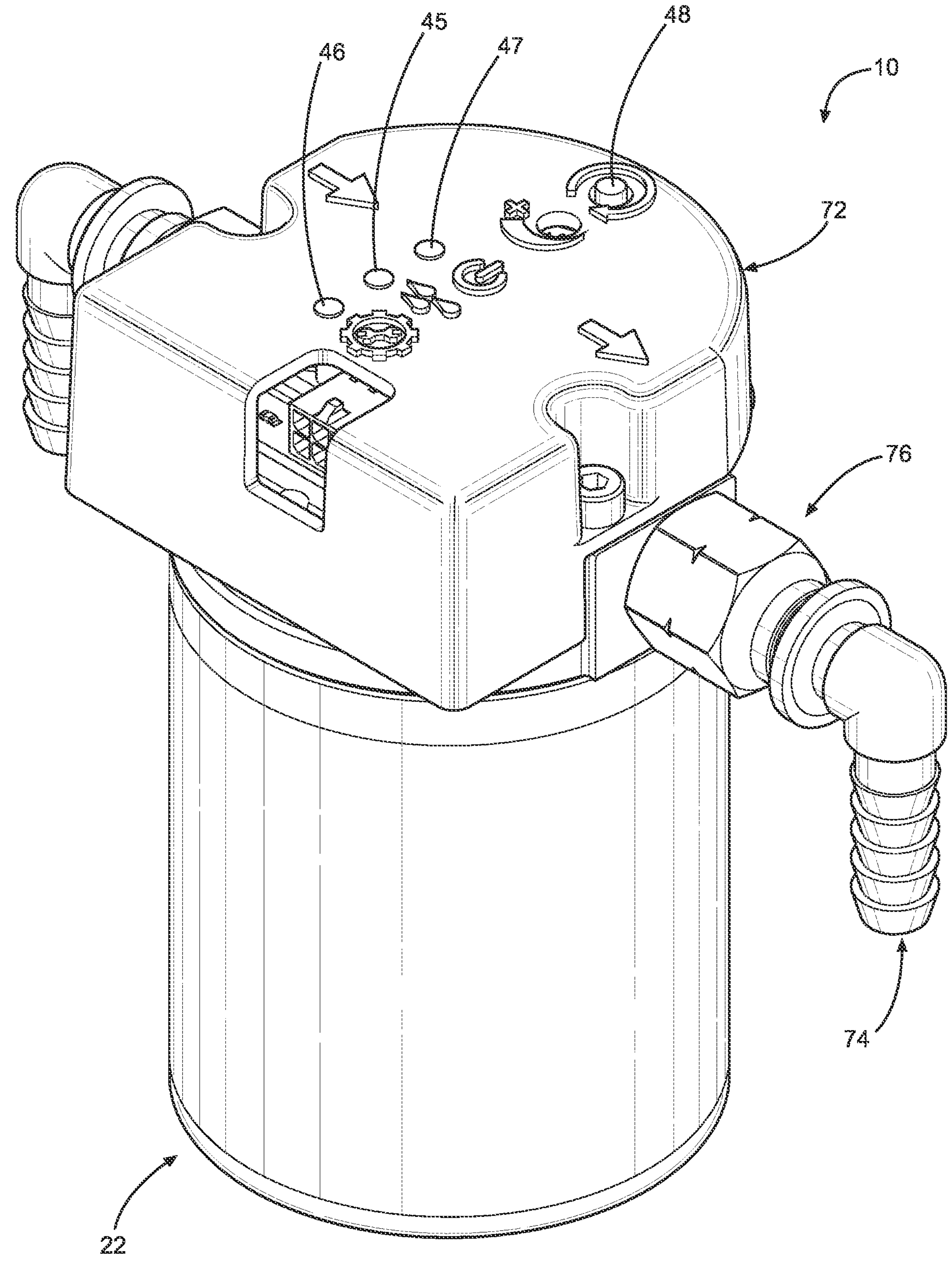
FIG. 1 is a front perspective view of a pump and controller system in accordance with one embodiment of the present disclosure.
Figure 2:
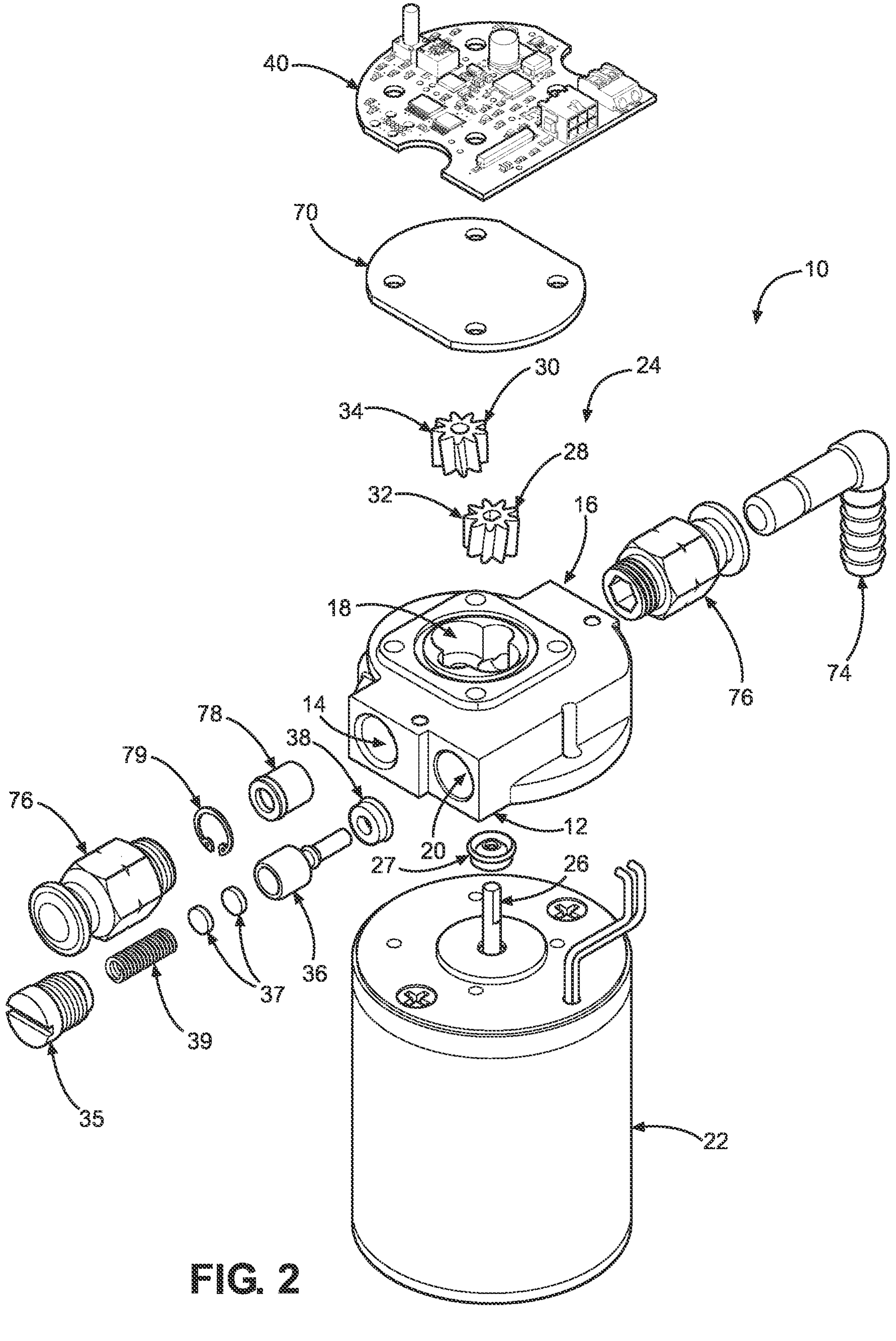
FIG. 2 is an exploded perspective view of a portion of a pump and controller system in accordance with one embodiment of the present disclosure.

As shown in FIG. 2, the pump housing 12 includes an inlet port 14 and an outlet port 16, both of which are in fluid communication with an internal pumping chamber 18 disposed within the pump housing 12. The inlet and outlet ports may also removably receive other components, such as fittings 76 and hose barbs 74. In some embodiments, inlet port 14 and outlet port 16 may each removably receive a fitting 76 with threads which removably receives a hose barb 74. Disposed between the fitting 76 and inlet port 14 may be a check valve 78, secured in place by retaining clip 79. Additionally, the pump housing 12 includes a cylindrical space 20 having an orifice 21 facilitating fluid communication between the cylindrical space 20 and internal pumping chamber 18. Preferably, the orifice 21 is located adjacent to the outlet port 16.

The fluid pump includes a motor 22. The pump motor 22 is preferably an electric motor; however, the pump motor 22 may alternatively be powered by other means such as by fuel combustion. A seal 27 disposed between pump motor 22 and pump housing 12 prevents contact between fluid flowing through pump housing 12 and pump motor 22. A pump drive shaft 26 is generally attached to the pump motor 22 and driven thereby. The pump drive shaft 26 is preferably made from a metal such as steel.

The pump also includes a pumping mechanism 24 which is at least partially disposed within the pumping chamber 18. The pumping mechanism 24, which is described in more detail below, is capable of receiving a fluid through the inlet port 14 into the pumping chamber 18 at a first pressure and discharging the fluid from the pumping chamber 18 through the outlet port 16 at a second pressure which is greater than the first pressure. Covering and sealing the pumping mechanism 24 is a cover 70, which may be fastened or otherwise secured to the pump housing 12.

The pumping mechanism 24 is driven by the pump motor 22 via the drive shaft 26. In some instances, the drive shaft 26 may be directly coupled to the pumping mechanism 24. In such cases, the pump housing 12 further includes a drive shaft opening through which the drive shaft 26 extends into the pump housing 12 and a seal to prevent fluid leakage through the drive shaft opening. In other instances, the drive shaft 26 may be magnetically coupled to the pumping mechanism 24, thereby eliminating the need for an additional seal.

The nature of the pumping mechanism 24 may vary in different embodiments of the present disclosure. In some instances, the pumping mechanism 24 may be a centrifugal pumping mechanism 24. In other instances, the pumping mechanism 24 may be a positive displacement pumping mechanism 24. For instance, in one embodiment, the pump may be provided as a positive displacement rotary vane pump, and the pumping mechanism 24 may include a pump liner disposed within the pumping chamber 18, together with other moving and static pump parts, such as a rear cap, endplate, O-rings, bearings, seals, rotor, vanes, alignment pins, snap rings, shaft, pressure relief valve, port inserts, washers, inlet strainer, and the like.

In another preferred embodiment, the pump may be provided as a positive displacement gear pump. According to this embodiment, the pump housing 12 is preferably oval shaped and, as discussed above, includes an internal pumping chamber 18, an inlet port 14, and an outlet port 16. The pump housing 12 further includes a drive shaft opening through which the drive shaft 26 extends into the pump housing 12. The pumping mechanism 24 includes a drive gear 28 and an idler gear 30. The drive gear 28 includes a plurality of drive gear teeth 32 and is disposed within the pumping chamber 18 and rotatably driven by the drive shaft 26. The idler gear 30 includes a plurality of idler gear teeth 34 which are intermeshed with the drive gear teeth 32 so that the idler gear 30 is rotatable when the drive gear 28 is driven by the drive shaft 26. The idler gear 30 is also disposed within the pumping chamber 18 and is attached to an idler shaft disposed within the pumping chamber 18.

During operation of the positive displacement gear pump embodiment, fluid is received into the pumping chamber 18 from the inlet port 14 at a first or initial pressure. The drive shaft 26 rotates the drive gear 28 which in turn rotates the idler gear 30 due to the intermeshed gear teeth 32, 34 of the two gears 28, 30, respectively. As the two gears rotate, fluid is trapped by the gear teeth. The fluid then travels around the inner perimeter of the pumping chamber 18 until it is forced out through the outlet port 16 at a second pressure which is greater than the first or initial pressure.

Noted above, the pump housing 12 also includes a cylindrical space 20 in fluid communication with the pumping chamber 18 via an orifice 21. In one preferred embodiment, the orifice 21 is located within the pump housing 12 adjacent to the outlet port 16 on the discharge side of the pumping mechanism 24, where fluid is forced out of the pumping mechanism at the second pressure which is greater than the first pressure at which the fluid is received within the pumping chamber 18. To illustrate, in a positive displacement gear pump embodiment of the pumping mechanism 24, the location of the orifice 21 would generally correspond to a point within the pump housing 12 so as to be adjacent a portion of the syrup or other fluid which has already passed through the drive and idler gears 28, 30 at the greater second pressure.

The pump and controller system 10 also includes a circuit board 40. In some embodiments, the circuit board may be an analog or digital printed circuit board. The circuit board 40 may have various components, such as the pump motor 22, so as to be capable of starting and stopping the pump motor 22, a controller 42, so as to be capable of controlling signals that start and stop the pump motor 22, a reed switch 41, so as to be capable of sensing operation conditions within the pump chamber 18, indicator lights 45, 46, and 47 so as to provide visual feedback of conditions within the pump chamber 18, a timer for controlling the length of time the pump motor is allowed to run, and countless other components not mentioned in this disclosure.

Figure 3:
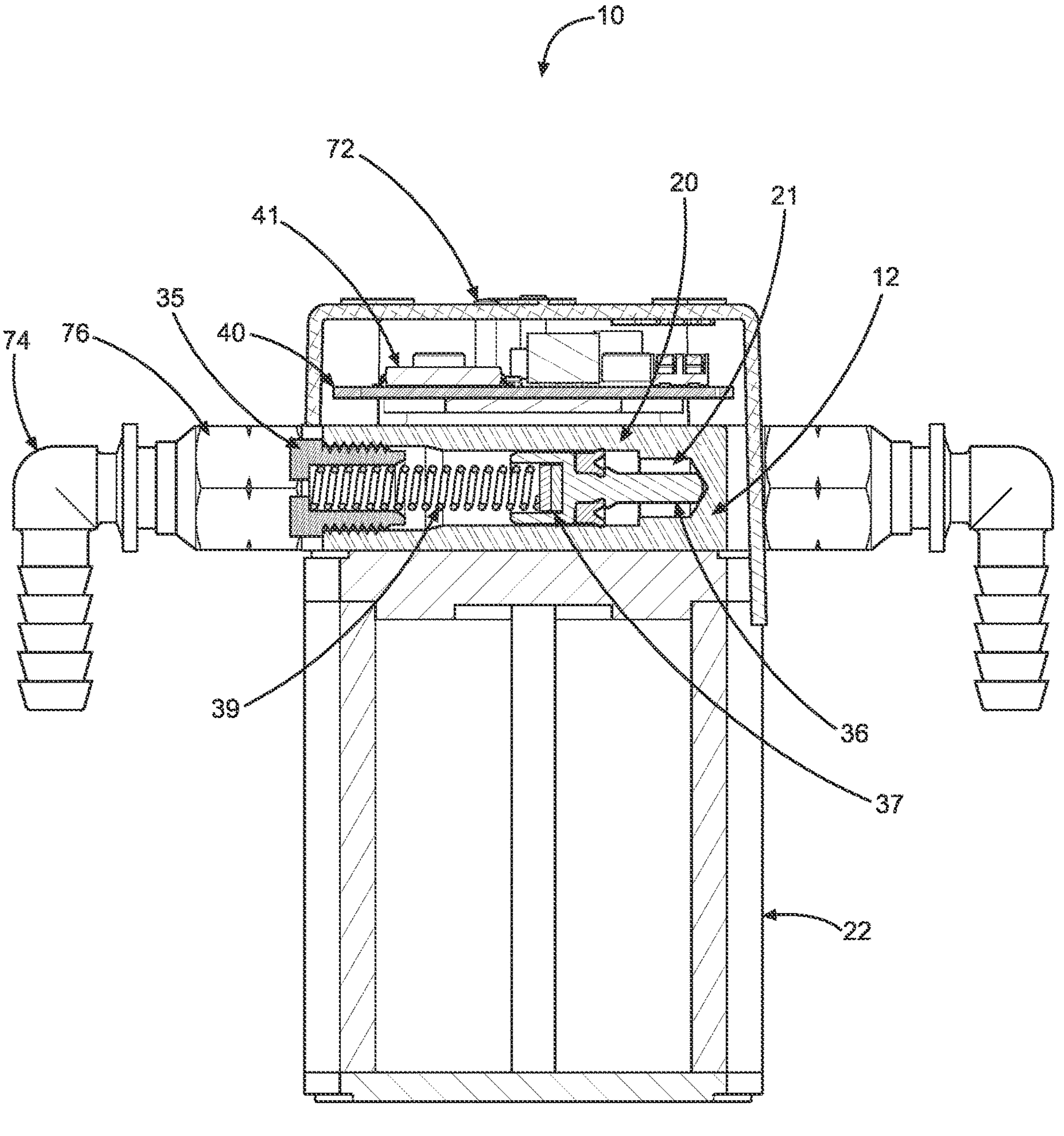
FIG. 3 is a side cross-sectional view of a portion of a pump and controller system showing the configuration when the reed switch is in a first position in accordance with one embodiment of the present disclosure.
Figure 4:
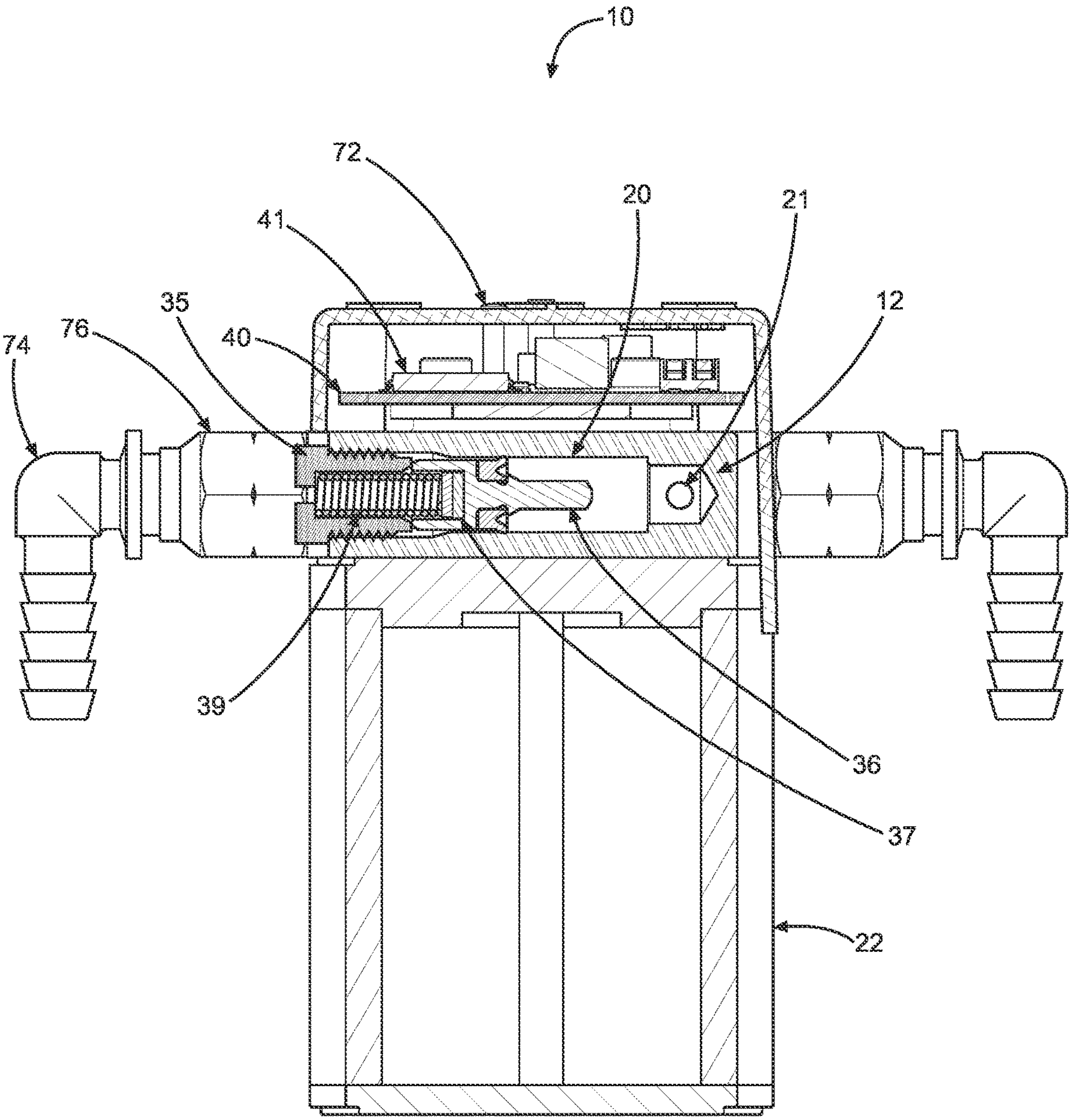
FIG. 4 is a side cross-sectional view of a portion of a pump and controller system showing the configuration when the reed switch is in a second position in accordance with one embodiment of the present disclosure.

The reed switch 41 contains ferromagnetic “reeds” that are movable between an open position, wherein the reeds do not touch, and a closed position, wherein the reeds touch, depending on the proximity of the reeds to a magnetic field. In the presence of a sufficiently strong magnetic field, the reeds move to either an open or a closed position depending on the reed switch is normally open or normally closed and either complete or interrupt an electric circuit. Because the present disclosure contemplates use of either type of reed switch, the reed switch is said to move from a first position to a second position. In some instances, the first position may be an open position and the second position is closed. Alternatively, the first position may be a closed position and the second position is open. FIGS. 3 and 4 show an embodiment of the pump and controller system 10 wherein the reed switch 41 is attached to the circuit board 40 at a point adjacent the cylindrical space 20 a predetermined distance away from the orifice 21.

When the pump and controller system 10 is operating at acceptable conditions or has been reset, the reed switch 41 is in a first position, shown in FIG. 3. Disposed within the cylindrical space 20 is a plunger 36 and a fastener having threads 35 removably fastened within the cylindrical chamber contacting or receiving a spring 39 adjacent the plunger 36. In some embodiments, the plunger 36 comprises several components, such as a plunger magnet 37 and plunger head 38. The spring 39 exerts a biasing force against one end of the plunger 36 pushing the plunger 36 towards the orifice 21, which, noted above, is, in some embodiments, on the discharge side of the pumping mechanism 24 adjacent the outlet port 16. While the pump and controller system 10 is in operation and fluid is being pumped through the pumping mechanism 24, fluid at the greater second pressure is forced through the orifice 21 and into the cylindrical space 20. The fluid contacts the plunger head 38—which forms a seal within the cylindrical space 20 preventing fluid from passing beyond the plunger head 38—exerting a force against the plunger 36 opposing the biasing force exerted by the spring 39. As the pressure within the cylindrical space 20 increases (thus exerting greater force against the plunger 36) the plunger 36 moves along the length of the cylindrical space 20 away from orifice 21, compressing spring 39. Thus, in this embodiment, greater travel by the plunger 36 along the length of the cylindrical space 20 away from orifice 21 corresponds to higher second fluid pressures.

So long as the pump and controller system 10 operates within a range of acceptable second pressures, the plunger 36, which may comprise a plunger magnet 37, never moves along the cylindrical space 20 far enough for the magnetic field of the plunger magnet 37 to cause the reed switch 41 to move from a first position to a second position. While operating within the range of acceptable second pressures, the controller 42 provides a signal to a first indicator light 45 indicating the pump is running properly and power indicator light 47, indicating the pump is on. Once the second pressures exceed the acceptable range, however, the corresponding fluid pressure within the cylindrical space 20 exerts enough force to move the plunger 36 beyond a predetermined point along the cylindrical space 20 away from the orifice 21 corresponding to a second pressure limit, shown in FIG. 4. At this point, the reed switch 41 moves to a second position caused by the plunger magnet 37 coming within a predetermined proximity to the reed switch 41. Movement of the reed switch 41 to the second position causes the controller 42 to stop the pump motor 22. The controller 42 also causes the first indicator light 45 to shut off, indicating the pump motor 22 is not running. For the pump motor 22 to run again, the plunger 36 must move back before the predetermined point along the cylindrical space 20 corresponding to a second pressure limit such that the reed switch 41 is no longer affected by the magnetic field of the plunger magnet 37 and moves to the first position.

Figure 6:
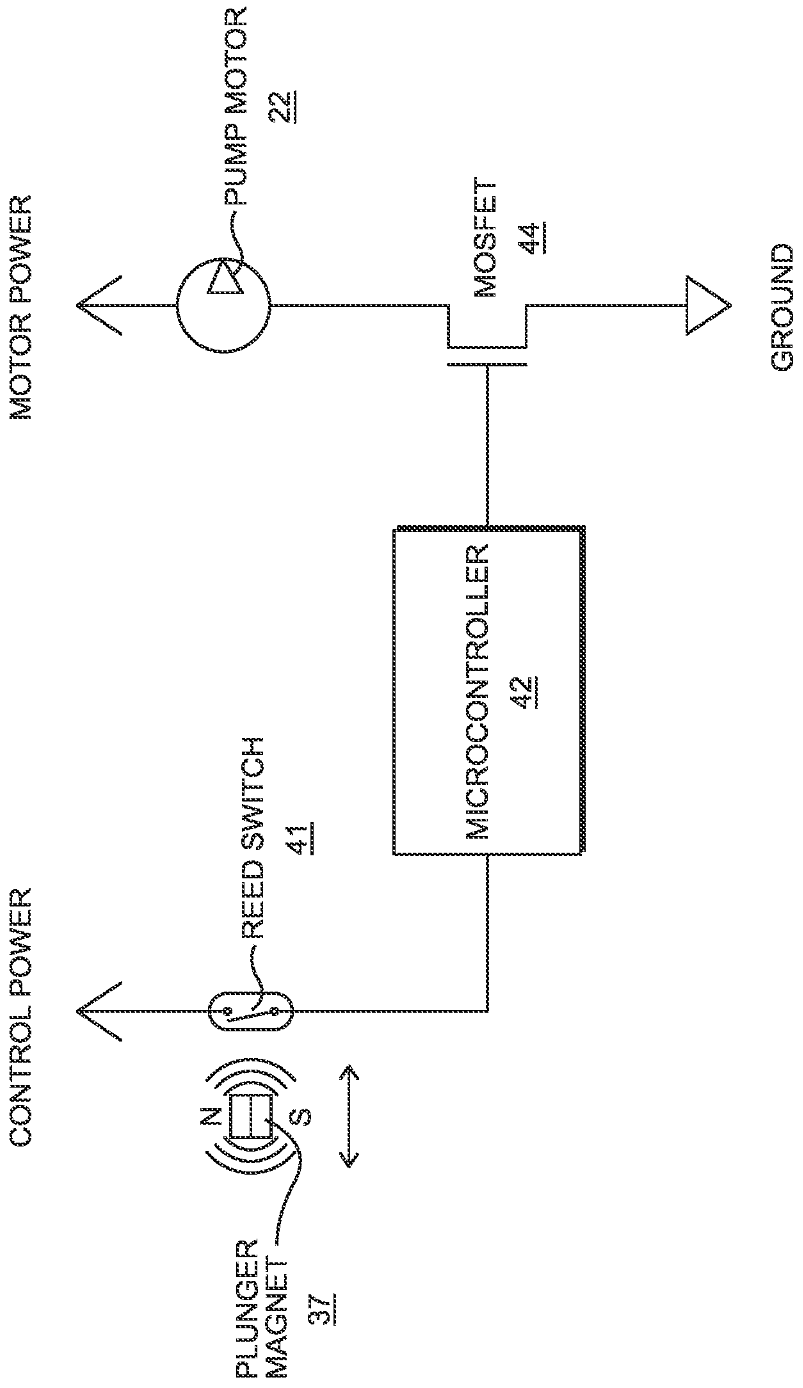
FIG. 6 is a schematic diagram illustrating electrical connections for a pump controller system in accordance with one embodiment of the present disclosure.

The pump and controller system 10 also includes a controller 42, as illustrated schematically in FIG. 6. The controller 42 receives the electrical signal from the reed switch 41, and also receives the electrical signal from a timer, if present. The controller 42 is also electrically connected to the pump motor 22 so as to be capable of starting and stopping the pump motor 22. The controller 42 may be preferably located within an enclosure formed as a part of the pump housing 12 or attached to the pump housing 12.

The controller 42 is programmed to stop the pump motor 22 under certain specified conditions, mentioned in detail above. Pump power may also be controlled by a mosfet 44. For instance, the controller 42 is programmed to immediately stop the pump motor 22 if the second pressure exceeds a predetermined pressure limit sensed using the reed switch 41. This second pressure limit can be adjusted through various means-including, but not limited to, varying the position of the reed switch on the circuit board 40 along the cylindrical space 20, varying the strength of the plunger magnet 37, the location of the plunger magnet 37 on the plunger 36, the spring constant of the spring 39, the size of the orifice 21, the lengths of the spring 39, cylindrical space 20, and plunger 36, and many other variables-depending upon the specific circumstances in which the pump and controller system 10 are being used. In a typical post-mix beverage dispenser application, this second pressure limit may be set at from about 40 psig to about 80 psig.

The controller 42 may also be programmed to stop the pump motor 22 if the pump motor 22 runs for a predetermined interval of time as measured by a timer. This prevents the pump from running for an extended time in a low pressure (i.e. vacuum) condition. The time interval may be factory selectable, preferably set to 60 seconds. Once the controller 42 stops the pump motor 22 due to the signal sent from the timer indicating a fault condition, the pump and controller system 10 must be manually reset to restart the pump motor 22. The pump motor 22 may also stop due to high amperage conditions, caused by, for instance, the viscosity or density of the pumped fluid being too high. High amperage conditions also indicate a fault condition, and the pump and controller system 10 must be manually reset to restart the pump motor 22. In both the timing and amperage fault situations described above, the controller 42 provides a signal to a second indicator light 46, indicating a fault condition within the pump and controller system 10.

In some instances, the controller 42 may also be programmed to restart the pump motor 22 after it has been stopped. For instance, the micro controller 42 may be programmed to restart the pump motor 22 if, after exceeding the predetermined second pressure limit triggering movement of the reed switch 41 from first position to second position, the second pressure falls below the predetermined pressure limit triggering the movement of the reed switch 41 from second position to first position. In a typical post-mix beverage dispenser application, the controller 42 may be programmed to restart the pump motor 22 immediately after the second pressure falls below the predetermined pressure limit.

Preferably, the pump and controller system 10 may also include a manual reset switch 48 which is electrically connected to the controller 42 in order to allow manual restarting of the pump motor 22 in circumstances in which the controller 42 is not programmed to automatically restart the pump motor 22. For example, if the controller 42 has stopped the pump motor 22 due to reaching a maximum time interval, the micro controller 42 is preferably not programmed to automatically restart the pump motor 22 after this occurrence. Rather, the use of the manual reset switch 48 is preferably required instead.

Figure 5:
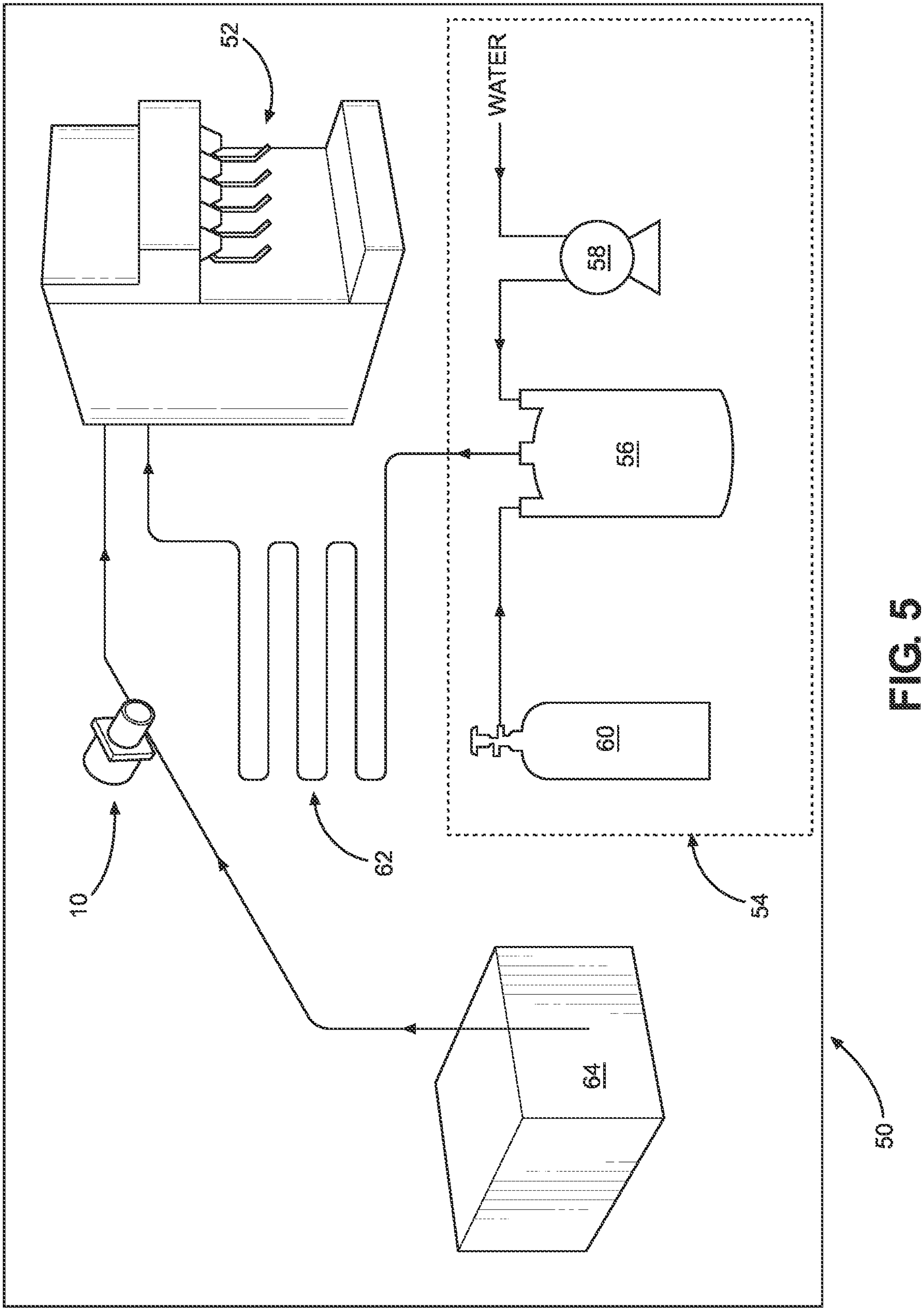
FIG. 5 is a schematic diagram illustrating a post-mix beverage dispenser system in accordance with one embodiment of the present disclosure.

In a further aspect, the present disclosure also relates to a post-mix beverage dispenser, which utilizes a pump and controller system 10 as described above. As shown in FIG. 5, the post-mix beverage dispenser 50 includes a beverage mixing and dispensing nozzle 52 and a supply of carbonated water 54 which is in flow communication with the beverage mixing and dispensing nozzle 52. For instance, the beverage dispenser 50 may include supply of carbonated water 54, in which a source of non-carbonated water (such as a municipal water supply line) is pumped into a mixing tank 56 by a water pump 58. This mixing tank 56 is also in flow communication with a source of carbon dioxide gas such as a compressed gas cylinder 60. Water is pumped into the mixing tank 56, and carbon dioxide gas is then mixed with, and dissolved into, the water in the mixing tank 56 to provide carbonated water. The carbonated water may also be passed through a chiller 62 before reaching the mixing and dispensing nozzle 52.

In addition, post-mix beverage dispenser 50 also includes a supply of concentrated beverage syrup 64, such as a bag-in-box syrup container. The dispensing nozzle 52 is also connected to, and in flow communication, with the bag-in-box or other supply of concentrated beverage syrup 64. The pump and controller system 10 described above may be used to move the syrup from the supply of concentrated beverage syrup 64 to the dispensing nozzle 52. Thus, the supply of concentrated beverage syrup 64 is connected to the pump inlet port 14 and the pump outlet port 16 is connected to the beverage mixing and dispensing nozzle 52 in order to supply the beverage syrup for the nozzle 52.

Advantageously then, according to the present disclosure, a post-mix beverage dispenser 50 is disclosed which utilizes a low-cost syrup pump, operating using an intuitive and mechanically simple, yet effective design.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A pump and controller system comprising:
- a pump housing having an internal pumping chamber, an inlet port and an outlet port, each of the ports being in flow communication with the pumping chamber, and further having a cylindrical space having an orifice which is also in flow communication with the pumping chamber;
- a pump motor;
- a circuit board having a controller for starting and stopping the pump motor,
- a pumping mechanism driven by the pump motor and at least partially disposed within the pumping chamber, the pumping mechanism being capable of receiving a fluid through the inlet port into the pumping chamber at a first pressure and discharging the fluid from the pumping chamber through the outlet port at a second pressure which is greater than the first pressure;

a plunger, having a plunger head and a magnet attached to the plunger, movably disposed in the cylindrical space, wherein the plunger head is in contact with a quantity of the fluid at the second pressure so that the fluid exerts a force pushing the plunger into the cylindrical space;

a spring disposed within the cylindrical space adjacent the plunger which exerts a biasing force pushing the plunger out of the cylindrical space, so that the plunger and the magnet move back and forth along a predetermined path within the cylindrical space as the second pressure increases or decreases; and a reed switch movable between a first position and a second position and disposed adjacent the path of the plunger magnet, wherein the reed switch moves to a second position when the plunger magnet moves beyond a predetermined point corresponding to the second pressure exceeding a predetermined pressure limit, wherein movement of the reed switch to the second position causes the controller to stop the pump motor and movement of the reed switch to the first position causes the controller to start the pump motor.

2. The pump and controller system of claim 1, wherein the pumping mechanism comprises:

a drive gear, having a plurality of drive gear teeth, disposed within the pumping chamber and rotatably driven by the pump motor; and an idler gear, having a plurality of idler gear teeth intermeshed with the drive gear teeth, disposed within the pumping chamber and attached to an idler shaft disposed within the pumping chamber.

3. The pump and controller system of claim 1, wherein the circuit board further comprises a timer for measuring how long the pump motor runs, where the timer sends a signal to the controller to stop the pump motor if the pump motor continuously runs for a period of time exceeding a predetermined maximum run time.

4. The pump and controller system of claim 1, wherein the circuit board further comprises a first indicator light to indicate when the pump is running.

5. The pump and controller system of claim 1, wherein the circuit board further comprises a second indicator light to indicate a fault condition.

6. A post-mix beverage dispenser comprising:

a beverage mixing and dispensing nozzle;

a supply of carbonated water in flow communication with the beverage mixing and dispensing nozzle;

a supply of beverage syrup; and a beverage syrup pump and controller system having a pump housing having an internal pumping chamber, an inlet port and an outlet port, each of the ports being in flow communication with the pumping chamber, and further having a cylindrical space having an orifice which is also in flow communication with the pumping chamber;

a pump motor;

a circuit board having a controller for starting and stopping the pump motor;

a pumping mechanism driven by the pump motor and at least partially disposed within the pumping chamber, the pumping mechanism being capable of receiving a fluid through the inlet port into the pumping chamber at a first pressure and discharging the fluid from the pumping chamber through the outlet port at a second pressure which is greater than the first pressure;

a plunger, having a plunger head and a magnet attached to the plunger, movably disposed in the cylindrical space, wherein the plunger head is in contact with a quantity of the fluid at the second pressure so that the fluid exerts a force pushing the plunger into the cylindrical space;

a spring disposed within the cylindrical space adjacent the plunger which exerts a biasing force pushing the plunger out of the cylindrical space, so that the plunger and the magnet move back and forth along a predetermined path within the cylindrical space as the second pressure increases or decreases; and a reed switch movable between a first position and a second position and disposed adjacent the path of the plunger magnet, wherein the reed switch moves to a second position when the plunger magnet moves beyond a predetermined point corresponding to the second pressure exceeding a predetermined pressure limit, wherein movement of the reed switch to the second position causes the controller to stop the pump motor and movement of the reed switch to the first position causes the controller to start the pump motor.

7. The post-mix beverage dispenser of claim 6, wherein the pumping mechanism comprises:

a drive gear, having a plurality of drive gear teeth, disposed within the pumping chamber and rotatably driven by the pump motor; and an idler gear, having a plurality of idler gear teeth intermeshed with the drive gear teeth, disposed within the pumping chamber and attached to an idler shaft disposed within the pumping chamber.

8. The post-mix beverage dispenser of claim 6, wherein the circuit board further comprises a timer for measuring how long the pump motor runs, where the timer sends a signal to the controller to stop the pump motor if the pump motor continuously runs for a period of time exceeding a predetermined maximum run time.

9. The pump and controller system of claim 6, wherein the circuit board further comprises a first indicator light to indicate when the pump is running.

10. The pump and controller system of claim 6, wherein the circuit board further comprises a second indicator light to indicate a fault condition.

* * * * *